United States Patent Office 3,551,284
Patented Dec. 29, 1970

3,551,284
BONDING OLEFIN COPOLYMERS TO POLYOLEFIN FIBERS
Augusto Portolani, Milan, Gino Panciroli, Bologna, and Sandro Giovanardi, Ferrara, Italy, assignors to Montecatini Edison S.p.A., Milan, Italy, a corporation of Italy
No Drawing. Continuation-in-part of application Ser. No. 432,400, Feb. 12, 1965. This application Sept. 12, 1968, Ser. No. 759,515
Claims priority, application Italy, Feb. 13, 1964, 3,159/64
Int. Cl. B32h 27/08
U.S. Cl. 161—252   10 Claims

ABSTRACT OF THE DISCLOSURE

Bonding elastomeric copolymer or ethylene and another alpha-olefin to fiber of isotactic olefin homopolymer by applying film of mixture of elastomeric copolymer, organic peroxide curing agent and carbon black or white mineral reinforcing filler directly onto homopolymer fiber and then heating to vulcanize the copolymer without melting the homopolymer fiber. Fiber needs no pretreatment. No solvent is used. Coating mixture may contain dispersion promoters and neutralizing agents.

CROSS-REFERENCE TO RELATED APPLICATION

This application is a continuation-in-part of our copending application Ser. No. 432,400, filed Feb. 12, 1965, now abandoned.

BACKGROUND OF THE INVENTION (1) Field of the invention

The present invention relates to a process for bonding elastomeric, saturated, amorphous copolymers to manufactured articles made up of a polyolefin consisting prevailingly of isotactic macromolecules, and to the articles obtained therefrom. More particularly, this invention relates to bonding copolymers of ethylene with higher alpha-olefins such as propylene and butene-1 to polyolefin fibers and fabrics, preferably fibers and fiabrics of isotactic olefin homopolymers.

(2) Description of the prior art

Joining of rubbers to plastics is often necessary in the manufacture of articels in which it is desired to have the stiffening and stability of shape under stress properties of plastics in addition to the elastomeric properties of rubber. This joining has been effected by incorporating textile fibers obtained from the plastics into the rubber composition by various means. New polyolefin plastics, such as polypropylene, which are suitable for manufacture into high tenacity textile fibers having excellent mechanical characteristics, have recently been marketed. New saturated elastomers have also been developed by copolymerizing ethylene with higher alpha-olefins, for example, copolymers of ethylene with propylene or butene-1. These elastomers possess good mechanical and elastic properties, as well as excellent resistance to oxidation, ageing, and to chemical degradation by common regaents.

It is highly desirable to combine the good characteristics of the new polyolefin plastics with those of the new saturated elastomers by joining or reinforcing the elastomers with fibers, filaments or fabrics made up of the polyolefin plastic, to produce articles such as conveyor belts, rubberized fabrics, trapezoidal belts, and tires.

A process has been suggested previously for bonding polypropylene textile fibers to a mixture comprising ethylene-propylene copolymer, in which process the polypropylene fiber has been superficially peroxidated after spinning and prior to vulcanization. In this process, the mixture comprising ethylene-propylene copolymer contains an ene-propylene copolymer, in which process the polypropylby free radical polymerization, for example an organic peroxide and divinylbenzene. This process is relatively complicated and costly, and does not always produce satisfactory bonding.

It has also been proposed, in U.S. Pat. 2,927,047, to apply a coating of an atactic propylene homopolymer or an atactic ethylene/propylene copolymer to a polyolefin surface by employing as solvent for the coating a reactive solvent which is either capable of swelling the polyolefin surface, such as ligroine, chloroform, chlorobenzene, tetrahydronaphthalene and the like, or which comprises a polymerizable unsaturated monomer, such as styrene, vinyl acetate or the like. Besides the considerable cost of such a process, the coated polyolefin does not have substantially improved mechanical characteristics as compared to the uncoated polyolefin fibers.

Another proposal, in U.S. Pat. 3,049,466 is a process for binding polymeric fibers, such as polypropylene fibers, to each other by heat sealing, which process comprises applying to the fibers, as a bonding agent, a lower melting polyolefin such as polyethylene, for example from a water dispersion of the lower melting polymer, and then heating to melt or fuse substantially all of the bonding agent and to fuse only the surface of the fiber. This technique has been found to be entirely unsatisfactory for bonding elastomeric copolymers to isotatic polypropylene fibers and, in any event, results in bonding strengths which are relatively poor and much too low for such important applications as conveyor belts and the like where both structural integrity and flexibility are important.

SUMMARY OF THE INVENTION

It has now been found that excellent bonding between a polyolefin fiber and a mixture comprising ethylene higher alpha-olefin copolymer can be provided by curing a film of the mix of elastomeric copolymer, in direct contact with the polyolefin fibers without any pre-treatment of the plastic.

More specifically, this invention provides a process for the adhesive bonding to a polyolefin fiber consisting prevailingly of isotactic macromolecules, of elastomeric, saturated, amorphous copolymers of ethylene with higher alpha-olefins. This process comprises applying directly onto both surfaces of a layer of the polyolefin fiber, or of the fabric or other article produced from said fiber, in the absence of solvent and with no preliminary treatment, a mixture having a thickness of about 4 mm., comprising an ethylene/higher alpha-olefin copolymer, curing or vulcanizing agents up to 20 parts by weight per 100 parts of copolymer and a reinforcing filler from 20 to 200 parts by weight per 100 parts of copolymer, and then heating at a temperature sufficient to vulcanize the copolymer mix, without melting the polyolefin fiber.

DESCRIPTION OF THE PREFERRED EMBODIMENTS

For optimum results, in some instances, an agent for promoting the dispersion of the filler and agents for neutralizing the acidic filler are added before the heating takes place. In the particular case where the polyolefin fiber used is a polypropylene fiber consisting prevailingly of isotactic macromolecules, the temperature at which the vulcanization is carried out may range from 100° to 150° C.

By the use of this process, wholly satisfactory adhesion values can be obtained without resort to any preliminary treatment of the polypropylene material. An advantage provided by this invention is, therefore, the elimination of equipment and/or special materials required for pretreating textile fibers, thus saving time and materials. Attempts made to employ the same process for bonding of the elastomers to materials of other fibers commonly combined therewith for reinforcement, such as cotton, nylon, rayon and the like, have not produced satisfactory bonding results.

Elastomeric olefin copolymers which may be employed in the practice of the present invention include the copolymers of ethylene with another alpha-olefin, in particular copolymers of ethylene and propylene or butene-1, obtained by known methods, such as copolymerizing the monomers in the presence of organometallic compounds of aluminum, such as $AlEt_3$, $AlEt_2Cl$ and $Al(iso\text{-}Bu)_3$ and soluble or dispersed vanadium compounds, such as $VCl_4$, $VOCl_3$ and $VAc_3$ wherein Ac is acetylacetone. The copolymers preferably have a molecular weight in the range of from 50,000 to 500,000 and an ethylene content of from 20 to 80% by mols. The elastomer can be used as such or in the form of foamed, spongy product, obtained by processes known in the art (U.S. Pats. 3,215,646 and 3,240,727).

The curing agents which are used in the ethylene/higher alpha-olefin copolymer composition comprise organic peroxides preferably admixed with agents which act as free-radical acceptors, such as sulfur, quinonimide compounds, furfural and its derivatives. Other additives and dispersion promoting agents which can be used are maleic acid and maleic anhydride and other maleic acid derivatives. The organic peroxide is used in amounts up to 20 parts by weight, preferably in amounts between 0.1 to 10 parts by weight per 100 parts of copolymer, and sulfur if any is used in an amount lower than half the amount of peroxide used.

The reinforcing fillers for the ethylene-alpha-olefin copolymer can be selected from any one of the common carbon black or white mineral fillers. They are used in amount between 20 and 200 parts by weight per 100 parts of copolymer. When a white mineral filler is used, it is preferable to subject the mix containing copolymer, reinforcing filler and dispersion promoting agent to a thermo-mechanical pre-treatment, according to known methods, such as that described in U.S. Pat. 3,394,100, prior to the addition to said mix of the peroxide and the other curing agents.

Other additives can also be used in the copolymer mix, such as basic substances suitable for neutralizing the influence of the acidic filler, and dyeing substances.

Among the suitable polyolefins for use as fibers in the practice of the present invention, polypropylene consisting prevailingly of isotactic macromolecules, obtained through polymerization of the monomer in the presence of stereo-specific catalysts consisting of aluminum organometallic compounds ($AlEt_3$, $AlEt_2Cl$) and lower valence titanium compounds ($TiCl_3$), has been found particularly suitable. This polymer possesses the particular advantage of being capable of being transformed into fibers by melt extrusion through spinnerets of suitable diameter. It then may be used in the manufacture of different types of fabric. Of these fabrics, the one which has been employed in the following examples to illustrate the present invention is listed, along with its characteristics, in the following Table I.

TABLE I

Type of fabric: Conveyor belts
Characteristics:
  Square fabric; high tenacity, Panama weave cord
  Count—1200 denier/240/3 ply
  Weight $(g./m.^2)$—727
  Diameter warp-yarn—1.13 mm.
  Diameter weft-yarn—1.13 mm.
  Number of filaments/cm.-warp—11.5
  Number of filaments/cm.-weft—5

In the following examples, which are presented to further illustrate the invention but are not intended to limit the scope thereof, the application of a film or sheet of the ethylene-propylene or ethylene-butene-1 copolymer composition to the polyolefin fiber is carried out directly in a calender at a temperature of approximately 40–50° C.

The thus rubberized fabrics are subsequently subjected to vulcanization by heating at a temperature between about 100° C. and 150° C. in an autoclave, in a press or by the rotocure process, depending on the type of industrial application for which they are designed.

EXAMPLE 1

A mix having the following composition was prepared:

| | Parts by weight |
|---|---|
| Ethylene-propylene copolymer (55% by mols of ethylene) ML(1+4) 100° C.=25 | 100 |
| Calcined kaolin | 100 |
| Zinc oxide | 2 |
| Maleic acid | 5 |
| Polymerized 2,2,4-trimethyl - 1,2 - dihydroquinoline (antioxidant) | 0.5 |
| Diorthotoluylguanidine | 0.5 |
| Titanium dioxide | 10 |
| Blue phthalocyanine | 1 |
| Sulfur | 0.4 |
| 37% 2,2-dicyclohexyl (4,4'-di-tert.butyl-peroxy) propane | 9 |

The first four ingredients of the mix were first subjected to thermo-mechanical treatment by kneading in a 2 liter inner mixer of the Banbury type at 200° C. for 15 minutes, and then the other ingredients were added thereto on a conventional roll mixer at 50–60° C.

For identification purposes, a portion of this mix was vulcanized at 135° C. for 40 minutes in the form of 120 x 120 x 2 mm. laminae, from which specimens for the evaluation of the mechanical characteristics of the vulcanizate were taken, and the following results obtained:

| | |
|---|---|
| Tensile strength $(kg./cm.^2)$ | 55 |
| Elongation at break (percent) | 360–445 |
| Elastic modulus at 300% $(kg./cm.^2)$ | 54 |
| Tear resistance (kg./cm.) | 37 |
| Shore A hardness | 69 |
| Residual elongation (percent)[1] | 10.5 |
| Residual elongation (percent)[2] | 5.5 |

[1] After 1 hour under stress at 200% elongation at 20° C.: reading after 1 minute.
[2] After 1 hour under stress at 100% elongation at 20° C.: reading after 1 minute.

On both surfaces of the polypropylene fiber which is identified in Table 1 was applied a layer of about 4 mm. thickness of the foregoing (unvulcanized) mix to form a rubber-fiber-rubber sandwich. The resulting specimens having a length of 120 mm., a width of 20 mm. and a thickness of about 8 mm. were tested to evaluate the bonding strength according to ASTM D 413/39 (Peeling test). In Table 2 the values of the rubber to fabric to rubber adhesion obtained, using different curing conditions, at different test temperatures are given.

TABLE 2

| Fabric type | Tension test temperature, °C. | Adhesion (expressed in kg./cm.) | |
| --- | --- | --- | --- |
| | | Vulcanization 40 mins. at 135° C. | Vulcanization 15 mins. at 150° C. |
| Conveyor belts | 22 | 2.1 | 3.8 |
| | 60 | 0.4 | 2.2 |
| | 90 | 0.15 | 1.6 |

EXAMPLE 2

A mix having the following composition was prepared by the same procedure employed in Example 1 (the first four ingredients being subjected to thermo-mechanical treatment in an inner mixer):

Parts by weight
Ethylene-propylene copolymer (55% by mols of ethylene) ML (1+4) 100° C.=25 _____ 100
Calcined kaolin _____ 100
Zinc oxide _____ 2
Maleic acid _____ 5
Polymerized 2,2,4-trimethyl-1,2-dihydroquinoline __ 0.5
Diorthotoluylguanidine _____ 0.5
Titanium dioxide _____ 10
Sulfur _____ 0.4
100% dicumyl peroxide _____ 9.9

The test vulcanization was performed for 60 minutes at 135° C. on 120 x 120 x 2 mm. laminae. Specimens for evaluating the mechanical characteristics of the vulcanizate were taken from the resulting vulcanizates and tested, with the following results:

Tensile strength (kg./cm.$^2$) _____ 36
Elongation at break (percent) _____ 400–420
Elastic modulus at 300% (kg./cm.$^2$) _____ 34
Tear resistance (kg./cm.) _____ 28
Shore A hardness _____ 64
Residual elongation (percent) [1] _____ 8
Residual elongation (percent) [2] _____ 4.5

[1] After 1 hour under stress at 200% elongation at 20° C.; reading after 1 minute.
[2] After 1 hour under stress at 100% elongation at 20° C; reading after 1 minute.

On both surfaces of the fabric of Table 1 was applied a layer of the foregoing mix and the resulting specimens were tested to evaluate the bonding strength, according to the method referred to in Example 1. The values of the rubber to fabric to rubber adhesion obtained under different curing conditions, at different test temperatures, are reported in Table 3.

TABLE 3

| Fabric type | Tension test temperature, °C. | Adhesion (expressed in kg./cm.) | |
| --- | --- | --- | --- |
| | | Vulcanization 60 mins. at 135° C. | Vulcanization 20 mins. at 150° C. |
| Conveyor belts | 22 | 3.0 | 3.0 |
| | 60 | 1.2 | 2.2 |
| | 90 | 0.7 | 1.2 |

EXAMPLE 3

In a roll mixer, a mix having the following composition was prepared:

Parts by weight
Ethylene-propylene copolymer (55% by mols of ethylene) ML (1+4) 100° C.=25 _____ 100
SRF carbon black _____ 30
Polymerized 2,2,4-trimethyl-1,2-dihydroquinoline __ 0.5
Magnesium oxide _____ 3
Sulfur _____ 0.4
100% dicumyl peroxide _____ 9.9

The test vulcanization was performed for 90 minutes at 135° C. on laminae of 120 x 120 x 2 mm. Specimens for the determination of the mechanical characteristics were taken from the vulcanizates and tested, with the following results:

Tensile strength (kg./cm.$^2$) _____ 64
Elongation at break (percent) _____ 430–440
Elastic modulus at 100% (kg./cm.$^2$) _____ 8
Elastic modulus at 300% (kg./cm.$^2$) _____ 35
Tear resistance (kg./cm.) _____ 20
Shore A hardness _____ 52
Residual elongation (percent) [1] _____ 6.5
Residual elongation (percent) [2] _____ 5

[1] After 1 hour under stress at 200% elongation at 20° C.; reading after 1 minute.
[2] After 1 hour under stress at 100% elongation at 20° C.; reading after 1 minute.

The polypropylene fabric of Table 1 was sandwiched between portions of the foregoing mix and (after curing) the specimens were tested to evaluate the bonding strength according to the method referred to in Example 1. Table 4 shows the adhesion values obtained under different vulcanization conditions, at different test temperatures.

TABLE 4

| Fabric type | Tension test temperature, °C. | Adhesion (expressed in kg./cm.) | |
| --- | --- | --- | --- |
| | | Vulcanization 90 mins. at 135° C. | Vulcanization 20 mins. at 150° C. |
| Conveyor belts | 22 | 2.0 | 3.0 |
| | 60 | 1.2 | 2.1 |
| | 90 | 0.32 | 1.4 |

EXAMPLE 4

A mix having the following composition was prepared by the same procedure employed in Example 1 (the first four ingredients being subjected to thermo-mechanical treatment in an inner mixer):

Parts by weight
Ethylene-propylene copolymer (55% by mols of ethylene) ML (1+4) 100° C.=25 _____ 100
Calcined kaolin _____ 100
Zinc oxide _____ 2
Maleic acid _____ 5
Polymerized 2,2,4-trimethyl-1,2-dihydroquinoline __ 0.5
Diorthotoluylguanidine _____ 0.5
Titanium dioxide _____ 10
Sulfur _____ 0.4
40% alpha - alpha' - bis(t.butylperoxy)diisopropylbenzene _____ 10.5

The test vulcanization was performed for 40 minutes at 150° C. on laminae of 120 x 120 x 2 mm. Specimens for the determination of the mechanical characteristics were taken from the vulcanizates and tested, with the following results:

Tensile strength (kg./cm.$^2$) _____ 40
Elongation at break (percent) _____ 420–490
Elastic modulus at 300% (kg./cm.$^2$) _____ 38
Tear resistance (kg./cm.) _____ 26
Shore A hardness _____ 65
Residual elongation (percent) [1] _____ 8
Residual elongation (percent) [2] _____ 4.5

[1] After 1 hour under stress at 200% elongation at 20° C.; reading after 1 minute.
[2] After 1 hour under stress at 100% elongation at 20° C.; reading after 1 minute.

The polypropylene fabric of Table I was sandwiched between portions of the foregoing mix and (after curing) the specimens were subjected to adhesion tests according to the method described in Example 1. In Table 5 the test conditions are set forth and the adhesion values are compared with those obtained under the same conditions but employing similar fabrics of non-polyolefin fibers.

TABLE 5

| Fabric type | Tension test temperature, °C. | Adhesion (kg./cm.), vulcanization 50 mins. at 150° C |
|---|---|---|
| Conveyor belts | 22 | 4.0 |
|  | 60 | 2.0 |
|  | 90 | 0.8 |
| Square cotton* for conveyor belts (medium weight fabric) | 22 | 1.0 |
|  | 60 | 0.1 |
|  | 90 | 0 |
| Square rayon* for conveyor belts (medium weight fabric) | 22 | 0.5 |
|  | 60 | 0.1 |
|  | 90 | 0 |
| Light square nylon* | 22 | 0.1 |
|  | 60 | 0 |
|  | 90 | 0 |

* The characteristics of the above fabrics are as follows:

| | | |
|---|---|---|
| Cotton cloth 32 oz (Soft). | Warp: number of filaments/cm count 12/10 ply. | 10 |
| | Weft: number of filaments/cm count 12/10 ply. | 4.5 |
| | Weight (mg./linear meter) | 50 |
| | Weight (g./m.²) | 900 |
| Rayon 70/30 | Warp: number of filaments/cm count 12/4 ply. | 16 |
| | Weft: number of filaments count 12/4 ply. | 7 |
| | Weight: (mg./linear meter) | 50 |
| | Weight (g./m.²) | 510 |
| Nylon 66 250/10 | Count 1,650 denier/3 ply | |
| | Warp: number of filaments/cm | 10 |
| | Weft: number of filaments/cm | 3.6 |
| | Weight (g./m.²) | 930 |

EXAMPLE 5

In a roll mixer, a mix having the following composition was prepared:

| | Parts by weight |
|---|---|
| Ethylene-propylene copolymer (55% by mols of ethylene) ML (1+4) 100° C.=25 | 100 |
| SRF carbon black | 30 |
| Polymerized 2,2,4-trimethyl-1,2-dihydroquinoline | 0.5 |
| Magnesium oxide | 3.0 |
| Sulfur | 0.4 |
| 40% alpha-alpha'-bis (t.butyl-peroxy) diisopropylbenzene | 10.5 |

The test vulcanization was performed for 50 minutes at 150° C. on laminae of 120 x 120 x 22 mm. Specimens for the determination of the mechanical characteristics were taken from the vulcanizates and tested, with the following results:

| | |
|---|---|
| Tensile strength (kg./cm.²) | 78 |
| Elongation at break (percent) | 530–610 |
| Elastic modulus at 300% (kg./cm.²) | 23 |
| Elastic modulus at 100% (kg./cm.²) | 11 |
| Tear resistance (kg./cm.) | 22 |
| Shore A hardness | 52 |
| Residual elongation (percent)[1] | 9 |
| Residual elongation (percent)[2] | 6.5 |

[1] After 1 hour under stress at 200% elongation at 20° C.; reading after 1 minute.
[2] After 1 hour under stress at 100% elongation at 20° C.; reading after 1 minute.

The polypropylene fiber fabric of Table 1 was sandwiched between portions of the foregoing mix, and the adhesion tests described in Example 1 were carried out on the cured specimens obtained therefrom. In Table 6 are set forth the valcanization and test conditions as well as the resulting adhesion values and the results are compared with those obtained under the same conditions but employing similar fabrics of non-polyolefin fibers.

TABLE 6

| Fabric type | Tension test temperature, °C. | Adhesion (kg./cm.), vulcanization 50 mins. at 150° C. |
|---|---|---|
| Conveyor belts | 22 | 4.0 |
|  | 60 | 0.5 |
|  | 90 | 0.35 |
| Square cotton for conveyor belts (medium weight fabric) | 22 | 1.1 |
|  | 60 | 0.4 |
|  | 90 | 0.1 |
| Square rayon for conveyor belts (medium weight fabric) | 22 | 0.5 |
|  | 60 | 0.1 |
|  | 90 | 0 |
| Light squard nylon | 22 | 0.1 |
|  | 60 | 0 |
|  | 90 | 0 |

EXAMPLE 6

A mix suitable for preparing foamed articles, and having the following composition, was prepared by the procedure described in Example 1:

| | Parts by weight |
|---|---|
| Ethylene-propylene copolymer (55% by mols of ethylene) ML (1+4) 100° C. =35 | 50 |
| Paraffinic oil | 40 |
| Natural rubber ML (1+4) 100° C.=35–40 | 10 |
| Calcined kaolin | 10 |
| Silica (Durosil) | 10 |
| Titanium dioxide | 10 |
| Magnesium dioxide | 2 |
| Diorthotoluylguanidine | 1 |
| Sodium bicarbonate | 3 |
| p,p,'-Oxobis-benzenesulfanyl-hydrazide | 2 |
| Difurfuryl-hydrazone | 1 |
| 37% 2,2 - dicyclohexyl(4,4'-di-tert.butyl - peroxy)propane | 10 |

The fabric of Table 1 was sandwiched between portions of the foregoing mix. Vulcanization was then carried out at 135° C. for 40 minutes according to the techniques used for foamed articles. The adhesion tests carried out on the specimens at all three test temperatures (22°, 60° and 90° C.), in every case resulted in adhesion values between fabric and foamed rubber higher than the tear strength of the foam layer. That is, in all cases under consideration, the foam article was torn while the fabric did not come off it.

EXAMPLE 7

The following comparative tests were carried out to illustrate the advantages of the process of the present invention for bonding elastomeric ethylene-higher alpha-olefin copolymer to fibers of isotactic olefin homopolymer as compared to the process of previously mentioned U.S. Pat. 3,049,466 and, more particularly, to illustrate the criticality of employing a film of a mixture of the elastomeric copolymer with reinforcing filler and vulcanization agent.

Test a

A fabric of a multifilament yarn of polypropylene consisting essentially of isotactic macromolecules, having a melting point of 170° C., a density of 0.9, an elongation at break of 22% and a tenacity of 8 grams/denier was employed. The fabric had a weight of 560 grams/square meter, a construction of 12 filaments/cm. in the warp direction (count 1200 denier 2 ply) and 9 filaments/cm. in the weft direction (count 1200 denier 2 ply). It was subjected to scoring and heat setting at 140° C. and then used in the test for fiber-to-fiber adhesion. A 25% carbon tetrachloride dispersion of polyethylene having a molecular weight of about 20,000 and a melting point of 110° C. was painted on one surface of two rectangular pieces of said fabric. After drying for 15 minutes at 110° C., the two coated surfaces were applied onto each other in such manner as to leave one inch of the fabric unadhered at one end and treated for 10 minutes at a temperature of 130° C. under a pressure of 0.5 kg./cm.$^2$.

From this sandwich of adhered material, five specimens having a width of 1 inch and a length of 5 inches, of which 1 inch at one end was not coated and adhered, were obtained. After 24 hours, they were tested to evaluate the bonding strength, according to ASTM D 4 13/39 (Peeling test). The adhesion, determined at room temperature and expressed in kg./cm. was about 0.6. A $CCl_4$ dispersion of polyethylene was used instead of a water dispersion as in Patent 3,049,466 because of the long time needed to obtain a good water dispersion.

Test b

Test a was repeated except that instead of the 25% carbon tetrachloride dispersion of polyethylene a 28% carbon tetrachloride dispersion of an ethylene-propylene copolymer having a molecular weight of about 55,000 and an ethylene content of 55% by mols was used. The adhesion test, carried out at room temperature on the specimens 24 hours after the heat treatment, showed a bonding strength of 0.1 kg./cm.

Test c

Test b was repeated except that instead of the copolymer dispersion, a 0.1 mm. thick sheet of ethylene-propylene copolymer having a molecular weight of about 55,000 and an ethylene content of 55% by mols was inserted between the fabrics to be adhered. The adhesion test, carried out at room temperature on the sandwich specimens 24 hours after the heat treatment, showed a bonding strength of 0.3 kg./cm.

Test d

Test b was repeated except that the dispersed copolymer contained 9.9 parts dicumylperoxide and 0.4 part sulfur per 100 parts of copolymer. The adhesion test, carried out at room temperature on specimens 24 hours after the heat treatment, showed a bonding strength of about 0.05 kg./cm.

Test e

Test c was repeated except that the sheet of the copolymer contained vulcanizing agents (9.9 parts dicumylperoxide and 0.4 part sulfur per 100 parts of copolymer), and that the heat treatment at 130° C. was carried for 60 minutes instead of 10 minutes. The adhesion test, carried out at room temperature on the sandwich specimens 24 hours after the heat treatment, showed a bonding strength of 0.6 kg./cm.

Test f

Test e was repeated with the only difference being that the sandwich of assembled material was heated for 20 minutes at 150° C. instead of 60 minutes at 130° C. so as to obtain a complete decomposition and subsequent complete cross-linking action of the peroxide. The resistance to detaching in this case, determined at room temperature after 24 hours, was 1.3 kg./cm.

Test g

Test d was repeated with the only difference being that the vulcanization was carried out for 20 minutes at 150° C. instead of for 10 minutes at 130° C. The resistance to detaching, determined at room temperature after 24 hours, was 0.2 kg./cm.

It will be noted that far superior bonding strength results were obtained in tests e and f, the only tests employing, in accordance with the present invention, both a film of the copolymer and a vulcanizing agent in admixture with the copolymer. However, comparison with the previous examples shows that even the results of tests e and f were not as good as those obtained when a reinforcing filler is employed as well. While test a, employing a polyethylene dispersion, resulted in adhesion values comparable to that of test e, comparison with the results of test b demonstrates that the method of U.S. Pat. 3,049,466, which might suffice for some purposes when it is merely desired to heat seal fibers with polyethylene, is totally inadequate for the bonding of ethylene/propylene copolymer to polypropylene fibers.

Variations can, of course, be made without departing from the spirit of the invention.

Having thus described our invention, what we desire to secure by Letters Patent and hereby claim is:

1. A process for adhering an elastomeric copolymer of ethylene and an alpha-olefin to a fibrous layer consisting essentially of isotactic polypropylene which comprises:
    (1) contacting (a) a self-supporting film consisting essentially of a saturated amorphous unvulcanized copolymer of ethylene with another alpha-olefin, a vulcanizing agent consisting essentially of an organic peroxide and sulfur, and a carbon black or white mineral reinforcing filler with (b) said fibrous layer consisting essentially of isotactic polypropylene, in the absence of solvent and without pretreating said fibrous layer; and then
    (2) heating said self-supporting film and said fibrous layer while in contact with each other to a temperature sufficient to vulcanize said self-supporting film but insufficient to melt said polypropylene fibers.

2. The process of claim 1 wherein said mixture further includes a filler dispersing agent and a neutralizing agent.

3. The process of claim 1 wherein said reinforcing filler is a white mineral filler, said mixture further contains an agent for promoting the dispersion of the filler, said dispersing agent being selected from the group consisting of maleic acid and maleic anhydride, and said copolymer, white mineral reinforcing filler and dispersing agent are subjected to mechanical mixing while heating before said curing agent is added thereto.

4. The process of claim 1 wherein the vulcanization temperature is in the range of from about 100° to 150° C.

5. The process of claim 4 wherein said ethylene-alpha-olefin copolymer is selected from the group consisting of an ethylene-propylene copolymer and an ethylene-butene-1-copolymer having a molecular weight ranging from 50,000 to 500,000 and an ethylene content of from 20 to 80% by mols.

6. The process of claim 1 wherein said reinforcing filler is a white mineral filler.

7. The process of claim 1 wherein said reinforcing filler is carbon black.

8. The process of claim 5 wherein said reinforcing filler is a white mineral filler.

9. The process of claim 5 wherein said reinforcing filler is carbon black.

10. As an article of manufacture, the article obtained by the process of claim 1.

References Cited

UNITED STATES PATENTS

| | | | |
|---|---|---|---|
| 2,628,214 | 2/1953 | Pinkney et al. | 117—138.8X |
| 2,927,047 | 3/1960 | Schulde et al. | 117—138.8 |
| 3,022,185 | 2/1962 | Delfosse | 106—308X |
| 3,049,466 | 8/1962 | Erlich | 117—138.8X |
| 3,299,183 | 1/1967 | Borghese | 260—79.5X |
| 2,949,394 | 8/1960 | Rodman | 161—151 |

FOREIGN PATENTS

| | | |
|---|---|---|
| 865,806 | 4/1961 | Great Britain. |
| 667,300 | 7/1963 | Canada. |

WILLIAM D. MARTIN, Primary Examiner

J. E. MILLER, JR., Assistant Examiner

U.S. Cl. X.R.

106—308; 117—138.8, 161; 156—306; 161—151

PO-1050
(5/69)

UNITED STATES PATENT OFFICE
CERTIFICATE OF CORRECTION

Patent No. 3,551,284            Dated December 29, 1970

Inventor(s) AUGUSTO PORTOLANI, GINO PANCIROLI and SANDRO GIOVA

It is certified that error appears in the above-identified patent and that said Letters Patent are hereby corrected as shown below:

Column 1, Line 44:    "fiabrics" should read -- fabrics --.

Line 49:    "articels" should read -- articles --.

Line 63:    "regaents" should read -- reagents --.

Column 2, Line 11:    "ene-propylene copolymer, in which proce the polypropyl-" should read -- organic peroxide and a monom which is polymerizable --.

Column 4, Line 4:    "conyeyor" should read -- conveyor --.

Signed and sealed this 30th day of January 1973.

(SEAL)
Attest:

EDWARD M. FLETCHER, JR.            ROBERT GOTTSCHALK
Attesting Officer                      Commissioner of Pat

PR